Feb. 7, 1950            E. T. DAVIS            2,496,860

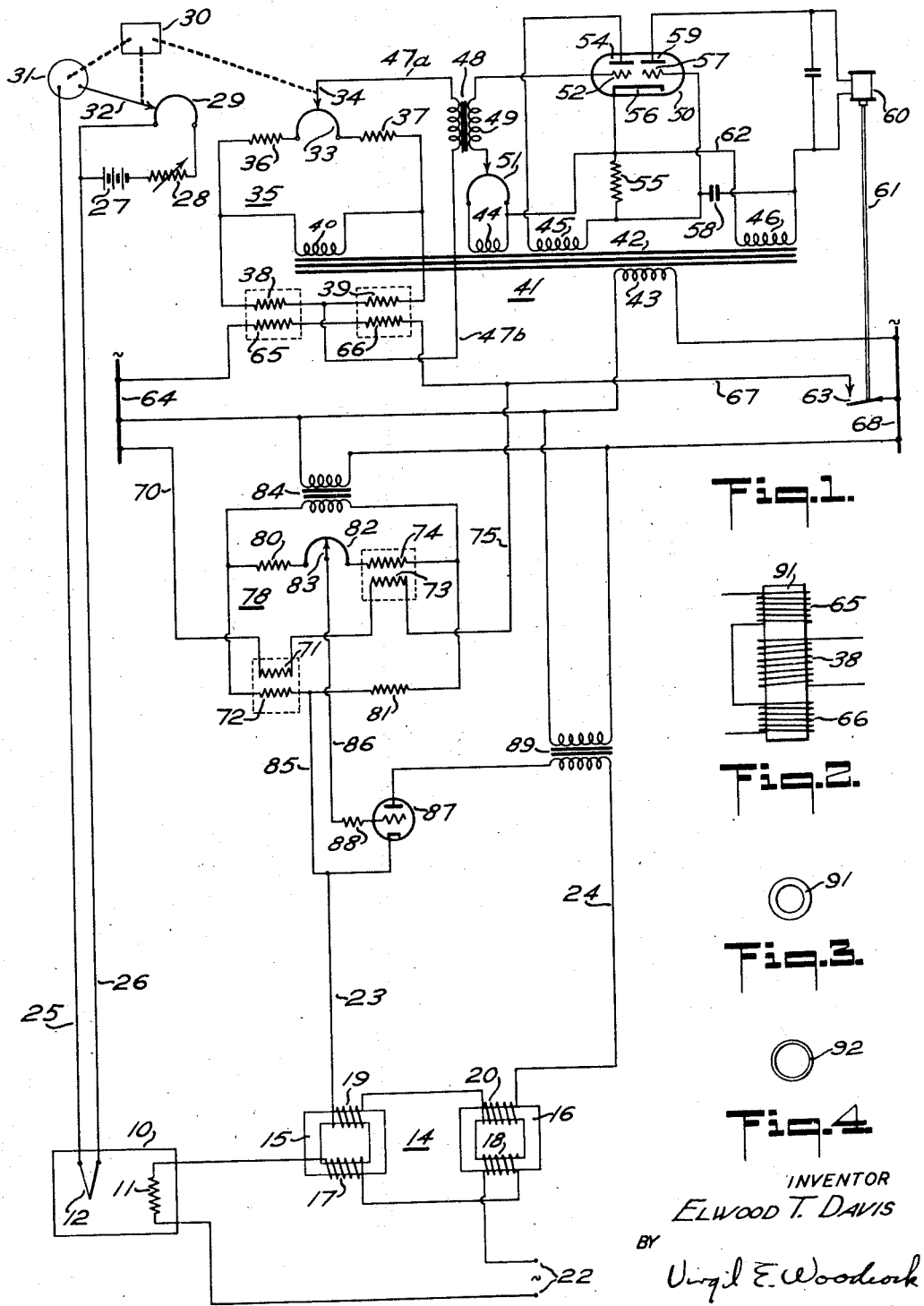

CONTROL SYSTEM

Filed Nov. 23, 1945                                  3 Sheets-Sheet 2

INVENTOR
ELWOOD T. DAVIS
BY
Virgil E. Woodcock
ATTORNEY

Feb. 7, 1950     E. T. DAVIS     2,496,860
CONTROL SYSTEM

Filed Nov. 23, 1945     3 Sheets-Sheet 3

INVENTOR
ELWOOD T. DAVIS
BY
Virgil E. Woodcock
ATTORNEY

Patented Feb. 7, 1950

2,496,860

UNITED STATES PATENT OFFICE 2,496,860

CONTROL SYSTEM

Elwood T. Davis, Brookline, Pa., assignor to Leeds and Northrup Company, Philadelphia, Pa., a corporation of Pennsylvania Application November 23, 1945, Serial No. 630,400

12 Claims. (Cl. 236—68)

1

This invention relates to systems for controlling the application of an agent to maintain at a desired value the magnitude of a condition, such as temperature, pressure, ion-concentration, or other physical, chemical, electrical, or other condition, and has for an object the provision of a smoothly and continuously-variable flow of the agent which minimizes departure in the magnitude of the condition from said desired value.

In my Patents 2,300,537 and 2,325,232, there are disclosed systems in which the magnitude of a condition may be maintained at a desired magnitude with any desired rate of droop correction. While systems of this type have been in wide use, particularly for loads having high thermal inertia, there are certain applications where it is desirable to provide for loads of low thermal inertia a smoothly and continuously-variable control action thereby to eliminate intermittent flow of the condition-varying agent. It is therefore a further object of the present invention to provide a control system of this character with a minimum of movable parts.

In carrying out the present invention in one form thereof, there is provided a balanceable network generally of the character set forth in my aforesaid patents where heating coils are arranged in heating relation with certain impedance elements of the network. In conjunction with a condition-measuring means, these heating coils introduce a modifying action in the network by means of which there may be achieved highly uniform control of the magnitude of the condition. In accordance with the present invention, there is interposed between the network and the final condition-varying means an arrangement for producing a smoothly and continuously-variable control action which eliminates undesirable fluctuations in the flow of the agent. More specifically, there is provided the combination of thermionic means or device for producing from unbalance of the network an output, the value of which is continuously variable with unbalance of the network. The output is then utilized for producing a smoothly and continuously-variable current of a magnitude proportional to that average value. The smoothly-variable current is then applied smoothly and continuously to vary the flow of the agent to maintain the magnitude of the condition at the desired value.

For a more detailed description of the invention and for further objects and advantages thereof, reference is to be had to the following description taken in conjunction with the accompanying drawings, in which:

2

Fig. 1 is a wiring diagram diagrammatically illustrating one modification of the invention;

Fig. 2 is a side elevation of one of the resistor-coil assemblies of Fig. 1;

Fig. 3 is a plan view of Fig. 2, with the resistor and coil omitted;

Fig. 4 is a plan view of another of the resistor-coil assemblies with the resistor and coil omitted;

Fig. 6 is a wiring diagram illustrating a still further modification of the invention.

Figure 5:
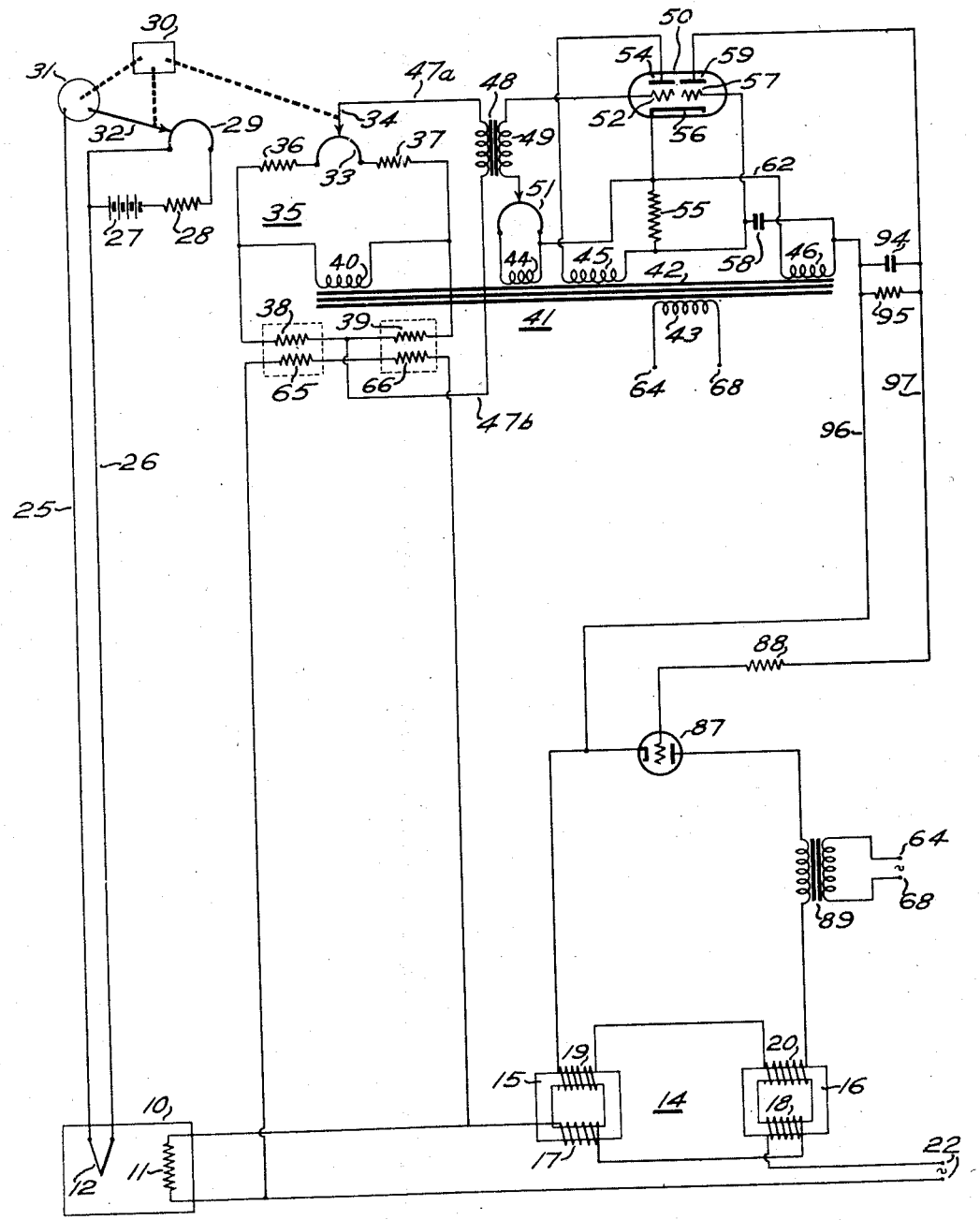
Fig. 5 is a wiring diagram diagramatically illustrating a further modification of the invention.
Figure 5:
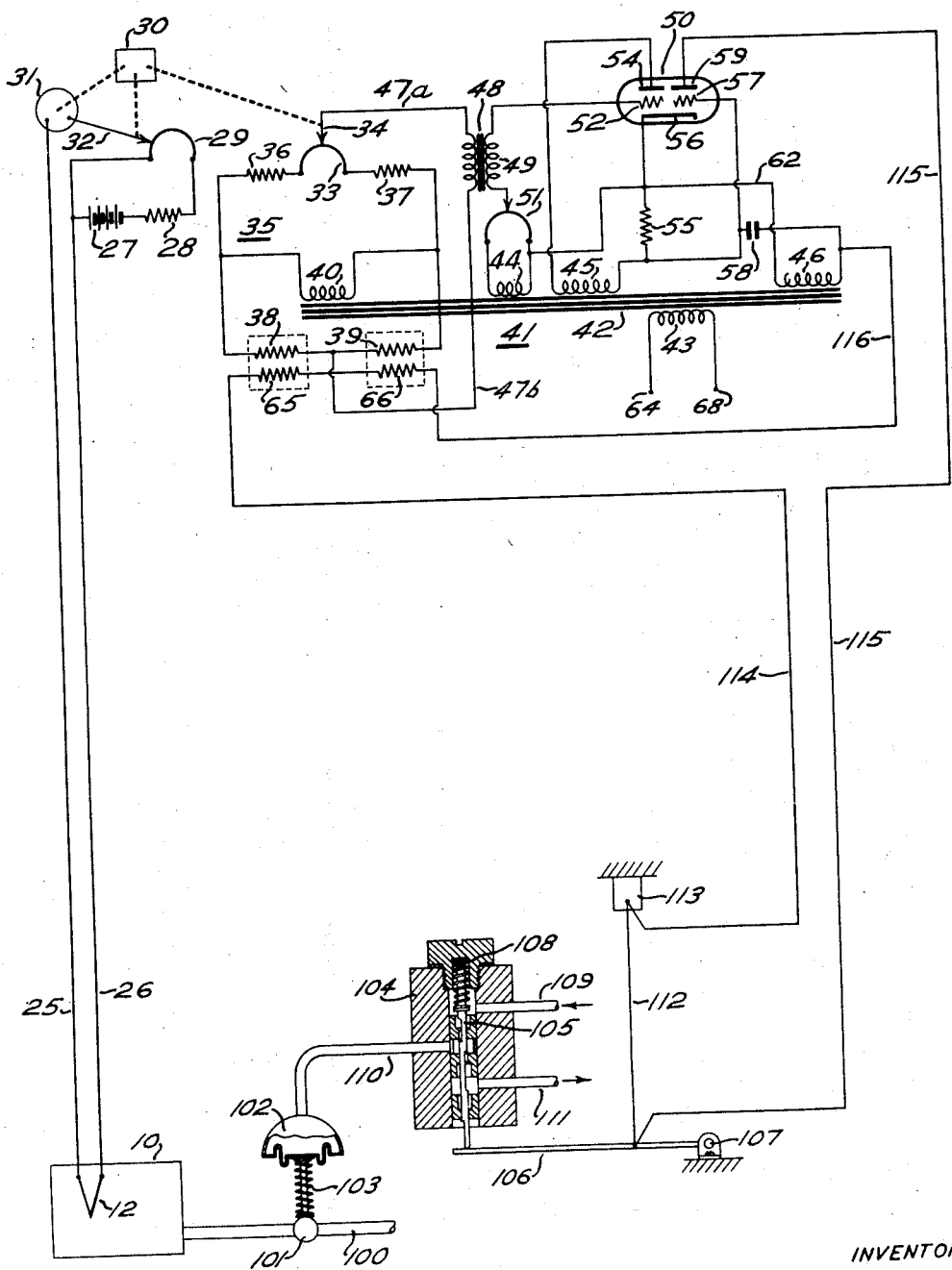

Referring to the drawings, the invention in one form has been shown in Fig. 1 as applied to the control of the temperature within a furnace 10 provided with a heating coil 11 and having a thermocouple 12 suitably exposed to the temperature within the furnace 10. The energization of the heater coil 11 is under the control of a variable impedance 14 of the saturable core type. The impedance 14 includes magnetically-saturable cores 15 and 16 respectively provided with output windings 17 and 18 and control windings 19 and 20. As well understood by those skilled in the art, the magnitude of alternating current flowing from supply terminals 22 will be dependent upon the magnitude of unidirectional current flowing from lines 23 and 24 through the control windings 19 and 20.

The present invention is particularly directed to systems of the general type disclosed in my aforesaid Patents 2,300,537 and 2,325,232. Many features of the present system have been fully described in said patents. For additional explanation of certain of the components of the system of Fig. 1, attention is particularly directed to Fig. 4 of my Patent 2,325,232, the operation of which is characterized by the time control of the successive applications of full power to the furnace resistor.

Again referring to Fig. 1, the thermocouple 12 is connected by conductors 25 and 26 to a conventional measuring network of the potentiometer type and which includes a battery 27, a variable resistor 28, a slidewire 29, and a mechanical relay 30 operable under the control of a galvanometer 31. The mechanical relay and the galvanometer may be of the type fully described and claimed in Squibb Patent 1,935,732. The mechanical relay functions relatively to position the slidewire 29 with respect to its contact 32 in accordance with variations in the temperature of thermocouple 12. The mechanical relay is utilized also relatively to position an adjustable impedance means such as a slidewire 33 with respect to its contact 34. The slidewire 33 is connected in a balanceable network 35 of the Wheatstone bridge type, which includes resistors 36 and 37 in two adjacent arms, and resistors or impedance means 38 and 39 in the remaining two adjacent arms. Alternating current is supplied to the network by means of a winding 40 of a transformer 41 having a core 42, a primary winding 43, and additional windings 44, 45, and 46. The output from the network 35 is connected by conductors 47a and 47b to the primary winding of a transformer 48, the secondary winding 49 of which is connected to the input circuit of a thermionic amplifier comprising one triode section of a twin triode vacuum tube 50. It will be observed that the input circuit not only includes the secondary winding 49, but it also includes a variable resistor 51 connected across the secondary winding 44 to apply an adjustable bias to the input circuit including the grid 52. The anode 54 is connected to one side of the transformer winding 45 with the other side of the latter connected through a resistor 55 to a cathode 56 which is common to both sections of the amplifying tube 50.

Since the network 35 is energized with alternating current, it will be understood that the alternating current output applied to the primary winding of the transformer 48 will have a relative polarity which will depend upon the sense or direction of unbalance of the network 35. The alternating current developed in the secondary winding 49 will be in phase or out of phase with respect to the alternating current applied to the anode circuit by the winding 45. The grid 52 has applied to it from the variable resistor 51 an alternating current bias of such a polarity that when the output voltage from the network 35 is zero, the grid 52 is negative when the anode 54 is positive. Accordingly, an output voltage from the network 35 in phase with the voltage of the anode 54 will increase the anode current while a voltage out of phase will decrease it. The current flowing through the cathode resistor 55 produces a negative bias on the grid 57 with respect to the cathode 56. For proper loading of the output circuit, including the anode 54, this resistor 55 preferably has a resistance of one-half megohm. The resultant negative bias applied thereby to the grid 57 would block the tube were it not for the provision of a capacitor 58, at one side connected to the grid 57 and at the other side connected to the winding 46 which, it will also be observed, is connected to the cathode 56. The capacitor 58 for each positive half cycle applied to the anode 59 applies a positive voltage to the grid 57, thereby to decrease the effect of the negative bias produced by the cathode resistor 55.

The net bias to the grid 57 is preferably negative for zero signal on the input transformer 48. Since the triode is not biased to cut-off, current will flow through it by way of transformer winding 46, the winding 60 of a relay 61, the anode 59, cathode 56, and by conductor 62 to the opposite side of transformer winding 46. The magnitude of the current flowing through the coil 60 in the absence of a signal on the input transformer 48 is adjusted as by the resistor 51 to a value intermediate the pick-up and drop-out values for the relay 61.

Assuming now that the temperature of the furnace 10 has decreased below a desired value, it will be understood the thermocouple 12 will reflect the decrease through the galvanometer 31 and the mechanical relay 30 will effect a change in the relative positions between the slidewire 33 and its contact 34. The adjustment will be in a direction to unbalance the bridge network 35 in a direction to increase the current flowing through the relay coil 60. In consequence, the relay 61 closes to complete a circuit which may be traced from an alternating current supply line 64, through a heating coil 65 associated with resistor 38, a heating coil 66 associated with resistor 39, conductor 67, and by contacts 63 to the other alternating current supply line 68.

A second circuit is simultaneously completed and may be traced from the supply line 64 by way of conductor 70, heating coil 71 associated with a resistor 72, heating coil 73 associated with a resistor 74, conductors 75 and 67, and by way of relay contacts 63 to the other supply line 68. The resistors 72 and 74 are connected in opposite arms of a second balanceable network 78 of the Wheatstone bridge type. The other opposite arms include resistors 80 and 81. An adjustable resistor 82 provided with a manually adjustable output contact 83 is connected between resistors 80 and 74. The network 78 is energized from supply lines 64 and 68 by means of a transformer 84. The output from the network 78 is applied by way of conductors 85 and 86 to the input circuit of a vacuum tube 87, the input circuit including a grid resistor 88. The output or anode circuit is energized from the supply lines 64 and 68 by means of a transformer 89. The output circuit also includes the conductors 23 and 24 and the windings 19 and 20 of the variable impedance 14.

As explained in my Patents 2,300,537 and 2,325,232, the heating coils 65 and 66 are disposed in heating relation with the resistors 38 and 39. For example, the heating coil 65, as shown in Fig. 2, may be wound on an aluminum shell 91 in two sections located respectively on opposite sides of the resistor 38. As shown in Fig. 3, the shell 91 is relatively thick so that its thermal mass is large. The heating effect of the heater 65 will, therefore, be slowly effective to elevate the temperature of the resistor 38 which is itself made of a material such as copper or nickel, having a high temperature coefficient of resistivity. The resistors 39, also having high temperature coefficient of resistivity forms with the heater 66 a generally similar assembly with a shell 92, having a relatively thin wall and small thermal mass. Preferably, the resistor 39 is wound over the central portion of the shell 92 while the heater 66 is uniformly wound over the entire length of the shell and over the resistor 39. Therefore, energization of the heating coil 66 produces a rapid change in the temperature of the resistor 39. In terms of operation, the closure of the contacts 63 energizes the heating coils 65 and 66. The temperature of the coil 66 and of its associated resistor 39 immediately rises to increase the resistance of resistor 39. The change in resistance is in a direction which tends to rebalance the bridge. If there is no further change in the relative settings between the slidewire 33 and the contact 34, the resistor 39 may be effective to rebalance the bridge, in which case, the relay 61 is de-energized. Thereupon, the coil 66 and the resistor 39 begin to cool and the unbalance in the bridge reappears, again to close the relay 61. This intermittent operation may continue for a number of signals.

Upon each closure of the relay 61 it will be recalled that the heater coil 65 is also energized, and it will be understood that the heating effect will elevate the temperature of the shell 92 so that the resistance of the resistor 38 will increase as its temperature increases. The effect in the network is in a direction to increase the unbalance as a function of the time of closure of the relay 61. As more fully explained in my patents above referred to, the relay 61 is intermittently operated between open and closed positions with the relative time of closure varied in accordance with the deviations in temperature of the furnace 10 and in accordance with the load demand thereof. The furnace heater in my aforesaid patents is directly controlled by the relay for intermittent full on-and-off operation.

In accordance with the present invention, the intermittent opening and closure of the relay 61 is converted into a gradually and smoothly varying control current which is applied to the variable impedance 14. This is accomplished by providing in the network 78 assemblies 73—74 and 71—72 of construction similar to the assembly 38—65. With the contact 83 midway of the slidewire 82, and with resistors 80, 74, 72, and 81 equal to each other, the voltage output will be zero. Upon energization of the coils 71 and 73, the resistance of the resistors 72 and 74 will be raised in temperature and the resultant increase in their resistances will unbalance the bridge to produce a voltage between conductors 85 and 86. This voltage, which is applied to the input or grid circuit of the tube 87 will be proportional to the average power input delivered through the relay contacts 63 to the heater coils 71 and 73. For the condition of a decreased temperature in the furnace 10, which was earlier assumed, the average time of closure of the relay contact 63 was increased. Accordingly, the power input to the heater coils 71 and 73 will be correspondingly increased and the voltage applied to the input circuit of the tube 87 correspondingly increases. Thus, the output current flowing by way of conductor 23 through the direct current coils 19 and 20 of the variable impedance 14 increases proportionately to increase the power input from the terminals 22 to the heater coil 11. If the additional heating current does not return the temperature to the desired value, the thermocouple 12 may either reflect a further reduction or a partial correction. In either case, the slidewire 33 will be readjusted to vary the unbalance voltage applied to the tube 50, which results in a change in the operation of the relay 61 as regards the relative times of opening and closure thereof. Though its operation continues to be intermittent, the power input to the bridge 78 is converted by the heater coils 71 and 73 into a smoothly varying change in the resistances of resistors 72 and 74. Accordingly, the heating current is smoothly variable between maximum and minimum limits.

In accordance with this modification of the invention, the furnace power input is smoothly varied from minimum to maximum with stable power input conditions at any point therebetween. The operation is non-oscillatory and stable. In the event it is desired to control the furnace temperature from a selected lower limit, the relative position of the contact 83 and the slidewire 82 may be changed to apply a predetermined voltage to the tube 87, thereby to produce a steady state unidirectional current of predetermined magnitude through the coils 19 and 20.

While the modification of the invention disclosed in Fig. 1 has been tried out and found to be satisfactory, the modification of Fig. 5 is preferred because it is simpler. Furthermore, substantially all moving parts have been eliminated. Corresponding reference characters have been applied to corresponding parts. In accordance with the embodiment of Fig. 5, the relay 61 has been omitted and the network 78 of Fig. 1 has been replaced by a converter comprising a capacitor 94 and a resistor 95 connected across the output circuit of the tube 50. Since the output from the tube 50 varies in accordance with the heat input needed in the furnace 10, a uniformly varying voltage is applied to the lines 96 and 97 leading to the input or grid circuit of the tube 87. Accordingly, the variation in the bias between the grid and cathode of the tube 87 serves to vary its conductivity so that the magnitude of the unidirectional current flowing through the windings 19 and 20 smoothly controls the flow of heating current to the furnace resistor 11. Further in accordance with the invention, it has been found that the heating coils 65 and 66 may be energized in accordance with the voltage across the furnace resistor 11. Instead of the on-and-off operation of Fig. 1, the heating coils 65 and 66 will be continuously energized. However, upon a change in furnace temperature resulting in a change in the heating current, the coils 65 and 66 will be heated to a greater degree or to a less degree, depending upon the direction of change of the temperature. The result will be an immediate change in temperature of the assembly 66—39 and a slower change in the temperature of the assembly 65—38. Thus, while the specific operation materially differs, the ultimate results in the network 35 will be the same as in the modification of Fig. 1. Accordingly, there are accomplished in the much simpler system of Fig. 5 the results fully explained in connection with Fig. 1.

It has been earlier stated that the invention is not limited to the control of electrical conditions or of temperature, but is of general application for the control of magnitudes of conditions. Where, for example, it is desired to control the flow of a fluid condition-varying agent, the system of Fig. 6 may be utilized. For convenience, there has been illustrated a system of controlling the flow of fuel delivered to a furnace 10 through a fuel supply line 100 by means of a valve 101 operable by variable air pressure applied to a diaphragm 102 in opposition to a spring 103. The air pressure applied to the diaphragm 102 is controlled by a pilot valve 104 of the type fully described in Stein et al. Patent 2,285,540. Briefly, the valve 104 consists of a valve member 105 operable by means of a lever 106 pivoted at 107 against the bias of a spring 108. The valve member 105 serves to produce from a source of air supply 109 an air pressure in a line 110 leading to the air chamber above the diaphragm 102 which varies in accordance with the position of member 105. The valve includes an outlet 111 which leads to atmosphere. As shown, the position of the lever 106 is determined by the length of a wire 112 of material having a high temperature coefficient of linear expansion. The wire 112 is fastened to a stationary support 113 with the respective ends thereof connected to conductors 114 and 115, respectively forming a circuit in series with heater coils 65 and 66 and the output of the tube 50. In accordance with this modification of the invention, the thermal-responsive device comprising the wire 112 serves to convert variations in the output of the tube 50 into a smoothly varying adjustment of the valve 101 for controlling the flow of fuel to the furnace 10. Further in accordance with the invention, a somewhat different action is secured by including the heater coils 65 and 66 in series with the output from the amplifying tube 50. This action will be explained by first assuming that the system has been in operation with the temperature of the furnace 10 at a desired value. Accordingly, the assemblies 38—65 and 39—66 will have the same temperature, and the relative position between the slidewire 33 and the contact 34 will correspond with that temperature. Thus, as shown in the drawing, the control point may be assumed to be the position where the contact 34 is approximately midway of the slidewire 33.

If now the temperature of the furnace 10 decreases, the galvanometer 31 and the mechanical relay 30 will relatively move the slidewire 33 with respect to the contact 34 in a direction to decrease the resistance in the branch including the resistor 36, and to increase the resistance in the branch including the resistor 37. The resultant unbalance voltage immediately appears at the transformer 48 and produces an increase in the output current flowing in the conductors 115 and 116. The increased current produces two effects. There is an increased heating of the wire 112 which thereupon elongates to permit lowering of the lever 106 under the influence of the spring 108. The repositioning of the valve member 105 increases the pressure in the chamber above the diaphragm 102 to move the valve 101 in a direction to increase the flow of fuel through the supply line 100. At the same time, the higher output current raises the temperature of the assemblies 39—66 and 38—65. As before explained, assembly 39—66 almost immediately attains its new temperature value, while the temperature of the assembly 38—65 rises at a lower rate. If the new adjustment of the valve 101 does not return the temperature of the furnace 10 to its desired value, the rise in temperature of the assembly 38—65 further unbalances the network 35 further to increase the output current in conductors 115 and 116. The further increase in current will further heat the wire 112 and cause movement of the valve 101 toward its open position. The foregoing actions will continue until the valve 101 has been moved to its fully open position or until the furnace temperature has been returned to its desired value, whichever occurs the earlier.

For a rise in the temperature of the furnace 10, it will be understood that the foregoing operations are reversed; that is, the galvanometer 31 and the mechanical relay 30 relatively move the slidewire 33 with respect to the contact 34 to unbalance the network 35 in the opposite direction. The output voltage which appears at the transformer 48 is reversed in phase with respect to the anode voltage applied to the first triode of the tube 50. Accordingly, the output current in the conductors 115 and 116 is decreased. The decrease of the current in the wire 112 causes it to contract, and through the lever 106 to raise the valve member 105 to decrease the pressure on the diaphragm 102. The spring 103 operates the valve 101 toward its closed position. At the same time, the decreased current through the heating coils 65 and 66 reduces the temperature of the resistors 38 and 39. The resistor 39 cools at a much higher rate than the resistor 38. If the increased temperature persists, the gradual cooling of the resistor 38 will further unbalance the network 35 further to decrease the output current and to produce further movement of the valve 101 toward its closed position. The foregoing actions will continue until the valve 101 is moved to its fully closed position or any selected minimum position thereof, or until the furnace temperature is returned to its desired value, whichever occurs the earlier.

Attention is again invited to my Patents 2,300,537 and 2,325,232 for other features which may be incorporated in any of the systems described herein. By way of illustration, there may be added the adjusting means for the droop-corrector assemblies and there may also be added additional control elements to assist in the heating up of a cold furnace.

In accordance with the present invention, the thermal assemblies 38—65 and 39—66 in each case are energized in a modulated manner to produce highly accurate control of furnace temperature notwithstanding widely changing load demands thereof. Yet, in each modification of the invention there is produced a control effort which is smoothly and continuously variable from one position to another, the result of which has made possible the utilization of control devices such as the saturable-core reactor or impedance element 14 and the thermal element or wire 112. The present invention is characterized by the accomplishment of all of the advantages attained by the systems disclosed in my aforesaid patents, with less equipment and fewer moving parts. In the modification of Fig. 5, the operation of the controlling system is relatively independent of variations in the line voltage. This will be apparent since a decreased line voltage not only decreases the heating effect of the furnace resistor 11, but also of the heating coils 65 and 66. It is to be further understood that the illustrations of the two applications of the invention are to be taken by way of illustration since it is apparent that the impedance element 14 may be utilized to maintain magnitudes of many conditions other than temperature at predetermined values. The modification of Fig. 6 may be utilized for the mechanical adjustment of control devices other than valves, and of course valves themselves may be utilized for controlling ion-concentration or mixture of other reagents or fluids. Where other conditions are to be controlled, the detector itself will be selected in accordance with the application. Even for temperature applications, total radiation pyrometers may be substituted for thermocouples and resistance thermometers and self-balancing Wheatstone bridges may be substituted for thermocouples and self-balancing potentiometers.

What is claimed is:

1. The combination with a balanceable network having means for unbalancing said network in accordance with variations in the magnitude of a condition, thermal means respectively included in said network and operable in accordance with the output of said network for modulating the output thereof, one of said thermal means being effective immediately to rebalance said network upon unbalance thereof and the other of said thermal means being later effective further to unbalance said network, of means for converting said modulated output into one which is smoothly variable over a range of condition-controlling magnitudes, and means for varying the magnitude of said condition in accordance with said smoothly variable output.

2. In a system for regulating the magnitude of a condition affected by an agent, said system including condition-responsive means, a balanceable network including an adjustable impedance and impedance means, means responsive to unbalance of said network for changing the network-balancing effect of said impedance means in a network-balancing direction and after balance changing said effect to unbalance said network for producing an intermittent output from said network, adjusting means including said condition-responsive means for adjusting said adjustable impedance by a predetermined amount to unbalance said network upon deviation of said condition from a selected value, the combination of means including a thermionic device for producing from said intermittent output unbalance of said network an output the average value of which is continuously variable with the degree of unbalance of said network, means operable in accordance with said last-named output for producing a smoothly and continuously variable current of a magnitude proportional to said average value, and means operable in accordance with said current for producing a smoothly and continuously variable flow of said agent.

3. In a system for regulating the flow of an agent for maintaining the magnitude of a condition at a desired value, said system including condition-responsive means, a balanceable network including a plurality of impedance elements and adjusting means operable in accordance with the output of said condition-responsive means for unbalancing said network upon deviation of said condition from said desired value, the combination of at least two heating coils for varying the impedance of at least two of said impedance elements, means operable in accordance with said unbalance for varying the flow of said agent in a direction to return said condition to said desired value, means for variably energizing said heating coils in accordance with unbalance of said network, and means interposed between said unbalance-responsive means and said flow-regulating means for producing a smoothly and continuously variable control action in avoidance of abrupt on-and-off flow of said agent.

4. In a system for regulating the heat input developed in a furnace by a heating agent to maintain the temperature of said furnace at a selected value, said system including a thermocouple, a balanceable network, adjusting means including said thermocouple for unbalancing said network upon deviation of said temperature from said selected value, said network including impedance means, means responsive to unbalance of said network for changing the network-balancing effect of said impedance means in a network-balancing direction and after balance changing said effect to unbalance said network for producing an intermittent output from said network, the combination of means including a thermionic device for producing from said intermittent output resulting from intermittent unbalance of said network an output the average value of which is continuously variable with said intermittent unbalance of said network, means operable in accordance with said continuously variable output for producing a smoothly and continuously variable current of a magnitude proportional to said average value, and means operable in accordance with said current for producing a smoothly and continuously variable flow of said agent.

5. In a system for regulating the flow of a heating agent to a furnace to maintain the temperature of the furnace at a desired value, said system including a thermocouple, a balanceable network including a plurality of impedance elements and adjusting means operable in accordance with the output of said thermocouple for unbalancing said network upon deviation in the temperature of said thermocouple from said desired value, the combination of at least two heating coils for varying the impedance of at least two of said impedance elements, means operable in accordance with said unbalance for varying the flow of said heating agent in a direction to return said temperature to said desired value, means for variably energizing said heating coils in accordance with unbalance of said network, and means interposed between said unbalance-responsive means and said flow-regulating means for producing a smoothly and continuously variable control action in avoidance of abrupt on-and-off flow of said agent.

6. In a system for regulating the flow of an agent for maintaining the magnitude of a condition at a desired value, said system including condition-responsive means, a balanceable network including a plurality of impedance elements and adjusting means operable in accordance with the output of said condition-responsive means for unbalancing said network upon deviation of said condition from said desired value and two heating coils for varying the impedance of at least two of said impedance elements at different rates, one of said two impedance elements tending to balance said bridge and the other tending to unbalance it, the combination of means operable in accordance with said unbalance for varying the flow of said agent in a direction to return said condition to said desired value, said means including a converter comprising a second balanceable network having at least one resistor having a substantial temperature coefficient of resistance which variably unbalances said second network, a heating coil for said resistor energized in accordance with unbalance of said first-named network, an amplifier for producing an output varying in accordance with the unbalance of said second network, said amplifier producing operation of said agent-varying means smoothly and continuously to regulate said flow of said agent in direction and extent to maintain said condition at said predetermined value.

7. In a system for regulating the flow of an agent to maintain the magnitude of a condition at a desired value, said system including condition-responsive means, a balanceable network including a plurality of impedance elements, adjusting means operable in accordance with the output of said condition-responsive means for unbalancing said network upon deviation of said condition from said desired value and two heating coils for varying the impedance of at least two of said impedance elements at different rates, one of said two impedance elements tending to balance said bridge and the other tending to unbalance it, the combination of means operable in accordance with said unbalance for varying the flow of said agent in a direction to return said condition to said desired value, said means including a thermal converter having an actuating element movable in accordance with temperature, means for varying the temperature of said converter in accordance with unbalance of said network, means operable by said element for operating said agent-varying means smoothly and continuously to regulate said flow of said agent in direction and extent to maintain said condition at said predetermined value, and means for energizing said heating coils in accordance with the unbalance of said network.

8. In a system for regulating the flow of an agent to maintain the magnitude of a condition at a desired value, said system including condition-responsive means, a balanceable network including a plurality of impedance elements, adjusting means operable in accordance with the output of said condition-responsive means for unbalancing said network upon deviation of said condition from said desired value and two heating coils for varying the impedance of at least two of said impedance elements at different rates, one of said two impedance elements tending to balance said bridge and the other tending to unbalance it, the combination of means operable in accordance with said unbalance for varying the flow of said agent in a direction to return said condition to said desired value, said means including a thermal converter including a temperature-responsive element and an actuating member movable in accordance with the temperature of said element, means for heating said element in accordance with unbalance of said network, means operable by the heating and cooling of said member for operating said agent-varying means smoothly and continuously to regulate said flow of said agent in direction and extent to maintain said condition at said predetermined value, and means for energizing said heating coils in accordance with the unbalance of said network.

9. In a system for regulating the flow of an agent to maintain the magnitude of a condition at a desired value, said system including condition-responsive means, a balanceable network including a plurality of impedance elements, adjusting means operable in accordance with the output of said condition-responsive means for unbalancing said network upon deviation of said condition from said desired value and two heating coils for varying the impedance of at least two of said impedance elements at different rates, one of said two impedance elements tending to balance said bridge and the other tending to unbalance it, the combination of means operable in accordance with said unbalance for varying the flow of said agent in a direction to return said condition to said desired value, said means including a converter for operating said condition-varying means in manner smoothly and continuously to regulate said flow of said agent in direction and extent to maintain said condition at said predetermined value, and means for energizing said heating coils in accordance with the magnitude of the flow of said agent.

10. In a system for regulating the flow of an agent to maintain the magnitude of a condition at a desired value, said system including condition-responsive means, a balanceable network including a plurality of impedance elements, adjusting means operable in accordance with the output of said condition-responsive means for unbalancing said network upon deviation of said condition from said desired value and two heaters for varying the impedance of at least two of said impedance elements at different rates, one of said two impedance elements tending to balance said bridge and the other tending to unbalance it, an amplifier for producing an amplified output which varies in accordance with said unbalance, the combination of means operable in accordance with said amplified output for varying the flow of said agent in a direction to return said condition to said desired value, said amplifier including a converter comprising a resistor and a capacitor connected in parallel across the output thereof for converting abrupt changes in the output to smooth changes, and means operable in accordance with the magnitude of flow of said agent for varying the output of said heaters.

11. In a system for regulating the flow of an agent to maintain the magnitude of a condition at a desired value, said system including condition-responsive means, a balanceable network including a plurality of impedance elements, adjusting means operable in accordance with the output of said condition-responsive means for unbalancing said network upon deviation of said condition from said desired value and two heating coils for varying the impedance of at least two of said impedance elements at different rates, one of said two impedance elements tending to balance said bridge and the other tending to unbalance it, an amplifier for producing an amplified output which varies in accordance with said unbalance, the combination of means operable in accordance with said amplified output for varying the flow of said agent in a direction to return said condition to said desired value, said amplifier including a converter comprising a resistor and a capacitor connected in parallel across the output thereof for converting abrupt changes in the output to smooth changes, a second amplifier controlled by the output from said converter, and means operable in accordance with the magnitude of flow of said agent for energizing said heating coils.

12. In a system for regulating the flow of a current for maintaining the magnitude of a condition at a desired value, said system including condition-responsive means, a balanceable network including a plurality of impedance elements and adjusting means operable in accordance with the output of said condition-responsive means for unbalancing said network upon deviation of said condition from said desired value, two heaters for varying the impedance of at least two impedance elements at different rates, one of said two elements tending to balance said bridge and the other tending to unbalance it, and an amplifier for producing an amplified output in accordance with the unbalance of said bridge, the combination of an impedance means for varying the flow of said current in accordance with the output from said amplifier, said amplifier including means for filtering the output thereof to produce a smoothly varying output thereby smoothly to regulate the flow of current to maintain said condition at said predetermined value, and means responsive to the magnitude of said current for energizing said heaters.

ELWOOD T. DAVIS.

REFERENCES CITED

The following references are of record in the file of this patent:

UNITED STATES PATENTS

| Number | Name | Date |
| --- | --- | --- |
| 2,297,836 | Levy | Oct. 6, 1942 |
| 2,325,308 | Davis | July 27, 1943 |
| 2,355,567 | Sparrow | Aug. 8, 1944 |